(12) United States Patent
Hayut et al.

(10) Patent No.: US 11,549,955 B2
(45) Date of Patent: Jan. 10, 2023

(54) MULTI/PARALLEL SCANNER

(71) Applicant: SCOPIO LABS LTD., Tel Aviv (IL)

(72) Inventors: Itai Hayut, Tel Aviv (IL); Erez Na'Aman, Tel Aviv (IL); Eran Small, Yehud (IL)

(73) Assignee: SCOPIO LABS LTD., Tel Aviv (IL)

( * ) Notice: Subject to any disclaimer, the term of this patent is extended or adjusted under 35 U.S.C. 154(b) by 420 days.

(21) Appl. No.: 16/875,665

(22) Filed: May 15, 2020

(65) Prior Publication Data
US 2020/0278362 A1 Sep. 3, 2020

Related U.S. Application Data

(63) Continuation of application No. PCT/IL2018/051252, filed on Nov. 20, 2018.
(Continued)

(51) Int. Cl.
*G02B 21/26* (2006.01)
*G01N 35/00* (2006.01)
(Continued)

(52) U.S. Cl.
CPC ....... *G01N 35/00029* (2013.01); *G02B 21/34* (2013.01); *G01N 2035/00039* (2013.01); *G01N 2035/00089* (2013.01); *G02B 21/002* (2013.01)

(58) Field of Classification Search
CPC ...... G02B 21/34; G02B 21/002; G02B 21/00; G02B 21/0004; G02B 21/0028; G02B 21/32; G01N 35/00029; G01N 2035/00039; G01N 2035/00089; G01N 2035/00049; G01N 2035/00178; G01N 2035/00306; G01N 2035/00326; G01N 35/00584; G01N 35/00722; G01N 35/00732;
(Continued)

(56) References Cited

U.S. PATENT DOCUMENTS 4,761,075 A * 8/1988 Matsushita ...... G01N 35/00029
356/394
6,847,481 B1 1/2005 Ludl
(Continued)

FOREIGN PATENT DOCUMENTS

WO 2017081539 5/2017
WO 2017081540 5/2017
(Continued)

OTHER PUBLICATIONS

International Search Report and Written Opinion for International Application No. PCT/IL2018/051252, 14 pages (dated Mar. 5, 2019).

*Primary Examiner* — Arnel C Lavarias
(74) *Attorney, Agent, or Firm* — FisherBroyles LLP; John Shimmick

(57) ABSTRACT

A microscope system may comprise a plurality of microscope modules, a cassette for holding a plurality of slides, a slide loader configured to move the plurality of slides between the cassette and the plurality of microscope modules, and a processor coupled to the slide loader. The processor may be configured with instructions which, when executed, cause the slide loader to move a slide into or from a selected microscope module among the plurality of microscope modules. Various other methods, systems, and computer-readable media are also disclosed.

20 Claims, 7 Drawing Sheets

Related U.S. Application Data

(60) Provisional application No. 62/588,630, filed on Nov. 20, 2017.

(51) Int. Cl.
 *G02B 21/34* (2006.01)
 *G02B 21/00* (2006.01)

(58) Field of Classification Search
 CPC ......... G01N 2035/00742; G01N 2035/00752; G01N 2035/00762; G01N 2035/00772; G01N 2035/00782; G01N 2035/00792; G01N 2035/00801; G01N 2035/00821; G01N 2035/00831; G01N 2035/00841; G01N 2035/00851; G01N 35/0099; G01N 35/025; G01N 35/04; G01N 2035/0401; G01N 2035/0412; G01N 2035/0417; G01N 2035/0418; G01N 2035/042; G01N 2035/0425
 USPC ....... 359/391, 362, 363, 368, 369, 392, 393, 359/394; 435/283.1, 287.1; 436/164, 436/165, 172, 807, 808
 See application file for complete search history.

(56) References Cited

U.S. PATENT DOCUMENTS

| | | | |
|---|---|---|---|
| 10,558,029 B2 | 2/2020 | Leshem | |
| 10,705,326 B2 | 7/2020 | Small | |
| 2007/0156917 A1 | 7/2007 | Hunt | |
| 2014/0049634 A1* | 2/2014 | Tatas | G02B 21/365 348/79 |
| 2016/0187636 A1 | 6/2016 | Ingber | |
| 2017/0131303 A1 | 5/2017 | Reinhardt | |
| 2018/0059395 A1* | 3/2018 | Gholap | G02B 21/34 |
| 2018/0348500 A1 | 12/2018 | Naaman, III | |
| 2018/0373016 A1 | 12/2018 | Leshem, III | |
| 2019/0235224 A1 | 8/2019 | Small | |
| 2019/0384962 A1 | 12/2019 | Hayut | |
| 2020/0041780 A1 | 2/2020 | Na'Aman | |
| 2020/0278362 A1 | 9/2020 | Hayut | |
| 2020/0278530 A1 | 9/2020 | Madar | |
| 2020/0302144 A1 | 9/2020 | Leshem | |

FOREIGN PATENT DOCUMENTS

| | | |
|---|---|---|
| WO | 2017081541 | 5/2017 |
| WO | 2017081542 | 5/2017 |
| WO | 2018078447 | 5/2018 |
| WO | 2018078448 | 5/2018 |
| WO | 2019077610 | 4/2019 |
| WO | 2019097523 | 5/2019 |
| WO | 2019097524 | 5/2019 |
| WO | 2020129064 | 6/2020 |
| WO | 2021095037 | 5/2021 |

* cited by examiner

MULTI/PARALLEL SCANNER

RELATED APPLICATIONS

This application is a continuation of International Application No. PCT/IL2018/051252, filed Nov. 20, 2018, published as WO 2019/097523, on May 23, 2019, which claims the benefit under 35 U.S.C. § 119(e) of U.S. Provisional Application No. 62/588,630, filed Nov. 20, 2017, entitled, "Multi/Parallel Scanner" the disclosures of which are incorporated, in their entirety, by this reference.

BACKGROUND

The present disclosure relates generally to digital microscopy and/or computational microscopy and, more specifically, to systems and methods for operating and managing multiple microscope modules with a slide loader.

Microscopy is used in several applications and use cases to analyze samples, such as a hospital, a lab or a clinic. A large volume of slides may need to be read at a microscope facility, and the throughput of such systems can be less than ideal. Commercial microscopes, such as whole slide imaging (WSI) devices that are currently available, often comprise a single scanning microscope that relies primarily on accurate mechanical scanning and high-quality objective lenses. An automatic slide loader may be incorporated to automatically insert and remove slides from the scanning system for scanning multiple slides to a single microscope. However, prior slide loaders may only service one microscope in at least some instances, which may be disadvantageous for several reasons: high cost of hardware, low flexibility to changing needs (such as a hospital expanding), sensitivity to hardware downtime which may lead to the throughput dropping to zero, difficulty in adjusting to different imaging needs, and inefficient workflow as each loader needs to be addressed separately. Computational methods may compensate for suboptimal components, such as objective lenses and scanning motors, to improve the resolution of the lenses and accuracy of the motors and possibly enable lowering costs. However, the throughput may still be limited by the speed in which the single scanning microscope can scan a single slide, and by the computational time to generate the image. The prior approaches may less than ideally allocate microscopes and processing resources in at least some instances.

To overcome this bottleneck, additional scanning systems may be introduced to the microscope system. Although multiple microscopes and slide loaders can be used in parallel, adding additional microscopes and slide loaders unduly increases complexity of the microscope system at a microscope location, such as a hospital. For example, the additional scanning systems may differ such that some scanning systems may not be appropriate for certain slides, which may have different scan needs. Thus, conventional slide loaders may not be capable of managing several scanning microscopes and slides in an efficient manner. In addition, conventional slide loaders may not be capable of interfacing with more than one scanning microscope. This can lead to less than ideal use of the scanning microscopes, and can make the prior systems more complex than would be ideal.

Some facilities such as pathology labs and hospitals may scan several different types of microscope samples, each with different types of imaging and urgency. The prior approaches may less than ideally prioritize the scanning of samples based on the type of sample being scanned. For example, some samples such as frozen samples, may need to be read before the sample degrades, while other samples may be less time sensitive. In addition, some samples may be read while a patient is in surgery to determine how to treat the patient surgically, while other samples may be less time sensitive. Also, some of the prior approaches have less than ideally addressed the throughput of different types of microscopes, such as computational microscopy and fluorescence.

In light of the above, it would be desirable to have improved methods and apparatus for increasing microscope slide reading through put at facility. Ideally, such improved microscope systems would overcome at least some of the aforementioned limitations of the prior approaches.

SUMMARY

As will be described in greater detail below, the instant disclosure describes various systems and methods for managing a plurality of microscope modules with a slide loader. This modular approach to scanning increases scanning throughput, improves the scanning of slides. The use of a plurality of microscope modules coupled to a slide loader may further allow flexibility with different types of microscopes which may be interchanged with the microscope modules. This approach may also lower costs and improve reliability without significantly adding complexity. For instance, having multiple loaders may not be feasible as cost and lab space may prohibit such an arrangement. Reliability may be improved due to the modularity of the microscope units. For example, if a facility has a system with four microscope modules and one module fails, throughput may drop 75% (as opposed to 100% for a conventional system), but the modularity may minimize the impact of wasted space and time to replace. Lab workflow and overall efficiency may be improved as all slides are loaded in one place, and down times of microscopes may be minimized or otherwise actively managed.

In one aspect, a slide loader system or microscope system may include a plurality of microscope modules, a cassette for holding a plurality of slides, a slide loader configured to move the plurality of slides between the cassette and the plurality of microscope modules, and a processor coupled to the slide loader. The processor may be configured with instructions which, when executed, cause the slide loader to move a slide into or from a selected microscope module among the plurality of microscope modules.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
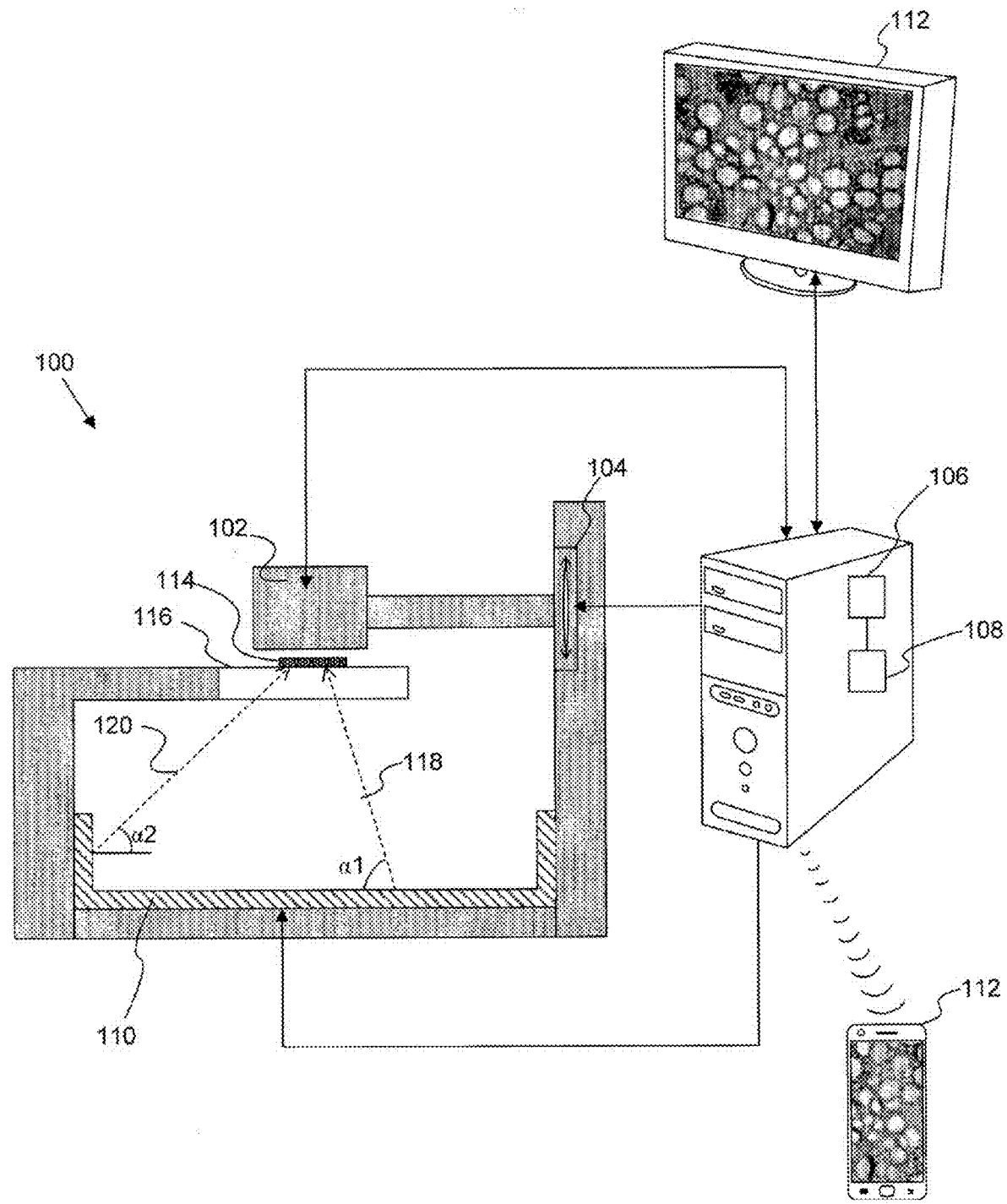
FIG. 1 is a diagram of an exemplary microscope, in accordance with some embodiments of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure is generally directed to systems and methods for managing multiple microscope modules with a slide loader. The system may support multiple microscope modules, which allows interchanging of microscope modules to support various combinations of microscopes. The system may include a slide loader capable of loading and unloading slides into and/or from the microscope modules. The system may optimize usage of the microscope modules by tracking slides, identifying scan needs for the slides, identifying which microscope modules are available, loading slides into appropriate microscope modules, and retrieving slides from the microscope modules after scanning. The user may not have to manually coordinate which slides are loaded into which locations.

Figure 2:
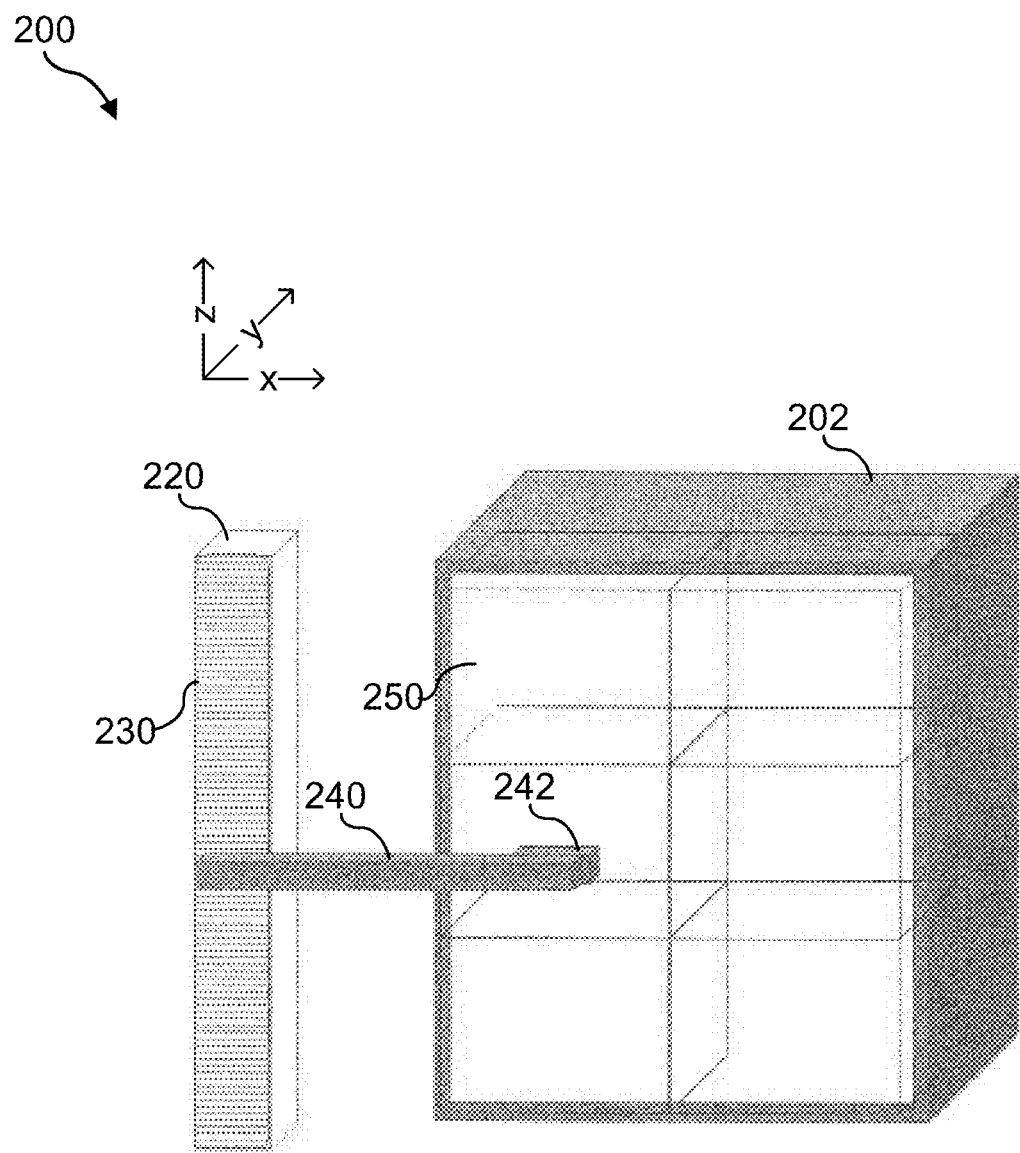
FIG. 2 is a diagram of an exemplary slide loader system comprising a plurality of modules, in accordance with some embodiments of the present disclosure.
Figure 3:
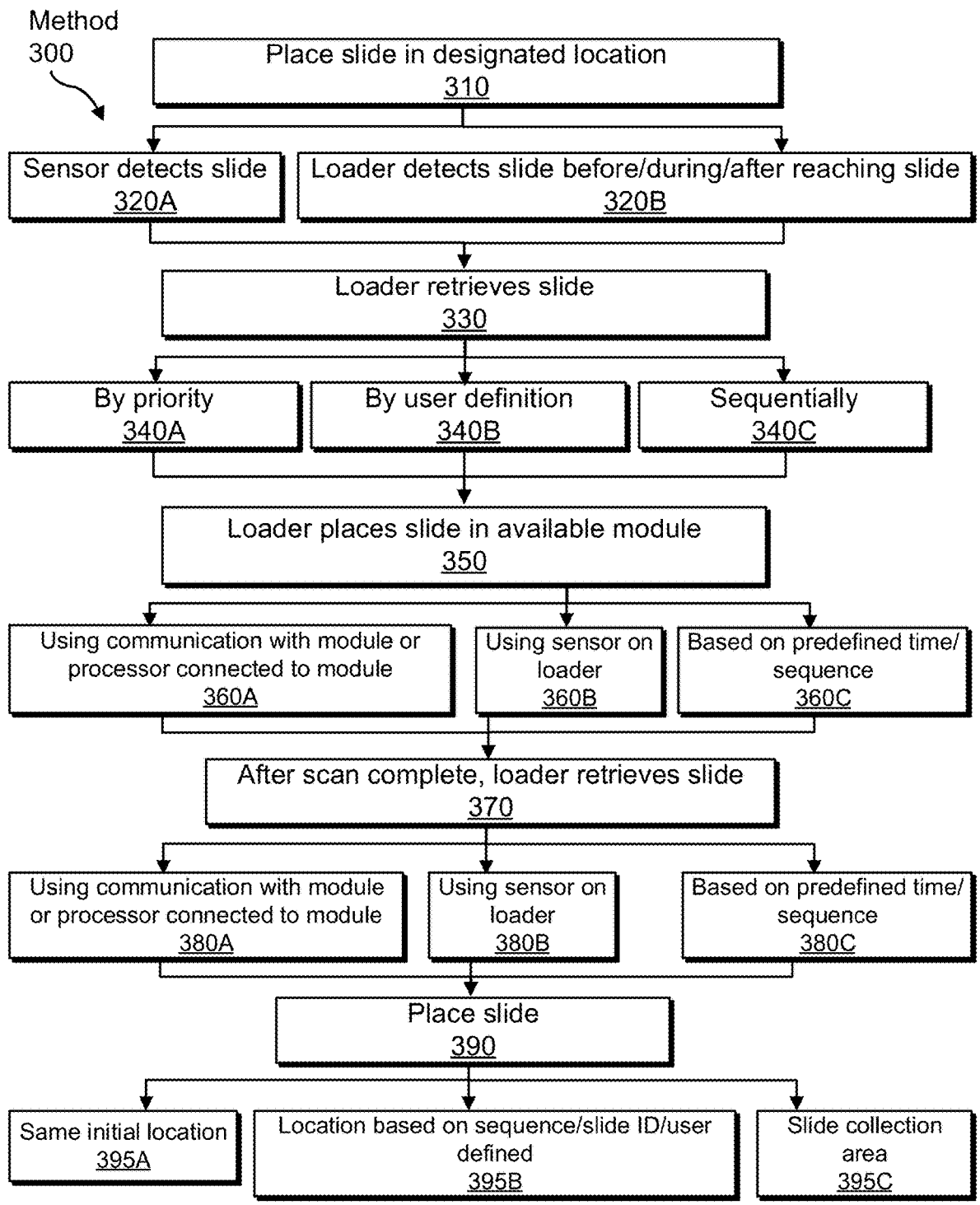
FIG. 3 is a workflow diagram showing an exemplary process for managing a plurality of scanners with a slide loader, in accordance with some embodiments of the present disclosure.
Figure 4:
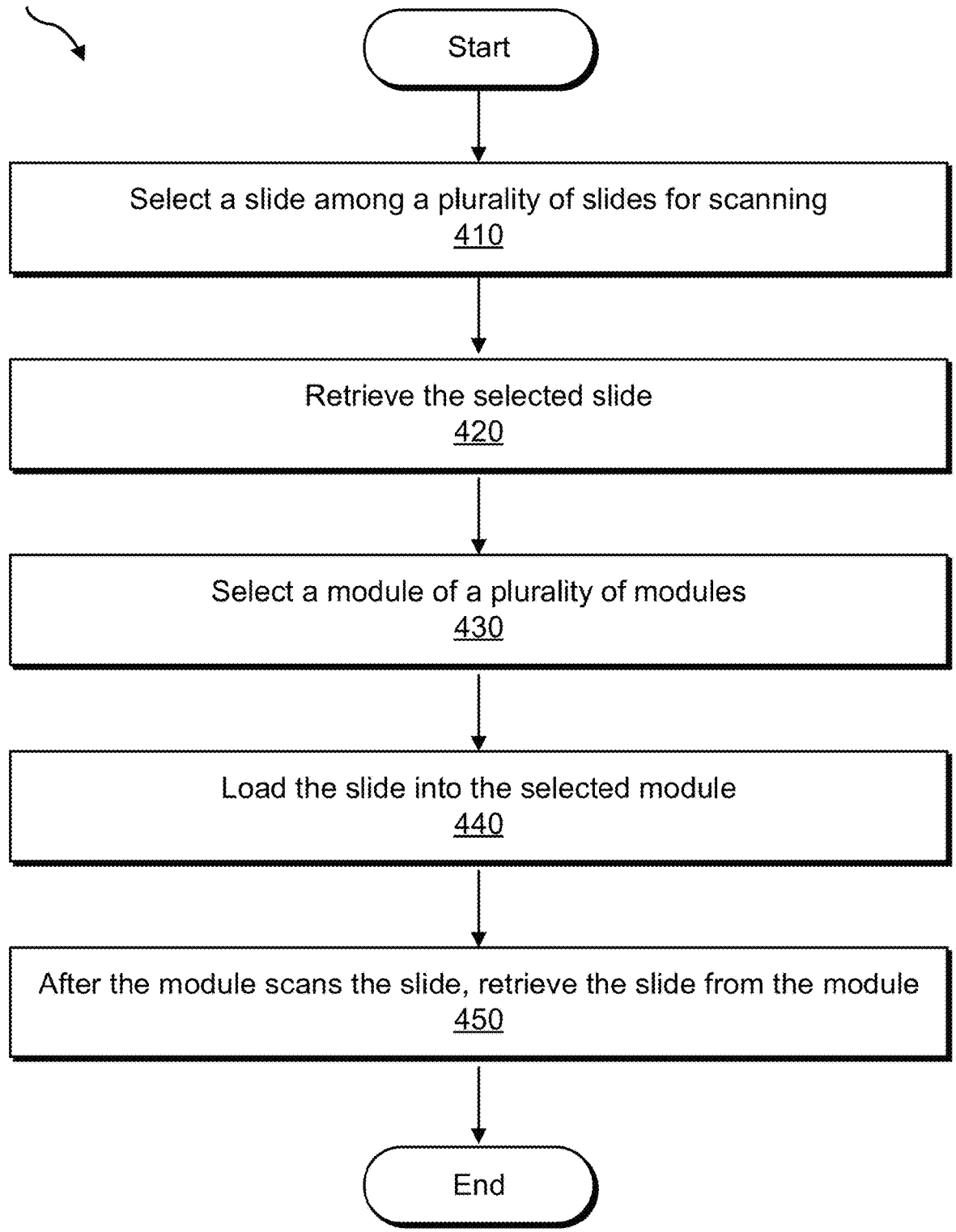
FIG. 4 is a flowchart showing an exemplary process for managing a plurality of scanners with a slide loader, in accordance with some embodiments of the present disclosure.

The following will provide, with reference to FIGS. 1-5F, detailed descriptions of managing multiple microscope modules with a slide loader. FIG. 1 illustrates an exemplary microscope. FIGS. 2 and 5A-5f illustrate various configurations for a slide loader with multiple microscope modules. FIGS. 3-4 illustrate exemplary processes for managing multiple microscope modules with a slide loader.

FIG. 1 is a diagrammatic representation of a microscope 100 consistent with the exemplary disclosed embodiments. The term "microscope" as used herein generally refers to any device or instrument for magnifying an object which is smaller than easily observable by the naked eye, i.e., creating an image of an object for a user where the image is larger than the object. One type of microscope may be an "optical microscope" that uses light in combination with an optical system for magnifying an object. An optical microscope may be a simple microscope having one or more magnifying lens. Another type of microscope may be a "computational microscope" that comprises an image sensor and image-processing algorithms to enhance or magnify the object's size or other properties. Enhancements may include resolution enhancement, quality improvement (e.g., aberration correction, computational refocusing, contrast enhancement, distortion correction, color enhancement, registration, removing certain elements of the data, etc.). The computational microscope may be a dedicated device or created by incorporating software and/or hardware with an existing optical microscope to produce high-resolution digital images. As shown in FIG. 1, microscope 100 comprises an image capture device 102, a focus actuator 104, a controller 106 connected to memory 108, an illumination assembly 110, and a user interface 112. An example usage of microscope 100 may be capturing images of a sample 114 mounted on a stage 116 located within the field-of-view (FOV) of image capture device 102, processing the captured images, and presenting on user interface 112 a magnified image of sample 114.

Image capture device 102 may be used to capture images of sample 114. In this specification, the term "image capture device" as used herein generally refers to a device that records the optical signals entering a lens as an image or a sequence of images. The optical signals may be in the near-infrared, infrared, visible, and ultraviolet spectrums. Examples of an image capture device comprise a CCD camera, a CMOS camera, a photo sensor array, a video camera, a mobile phone equipped with a camera, a webcam, a preview camera, a microscope objective and detector, etc. Some embodiments may comprise only a single image capture device 102, while other embodiments may comprise two, three, or even four or more image capture devices 102. In some embodiments, image capture device 102 may be configured to capture images in a defined field-of-view (FOV). Also, when microscope 100 comprises several image capture devices 102, image capture devices 102 may have overlap areas in their respective FOVs. Image capture device 102 may have one or more image sensors (not shown in FIG. 1) for capturing image data of sample 114. In other embodiments, image capture device 102 may be configured to capture images at an image resolution higher than VGA, higher than 1 Megapixel, higher than 2 Megapixels, higher than 5 Megapixels, 10 Megapixels, higher than 12 Megapixels, higher than 15 Megapixels, or higher than 20 Megapixels. In addition, image capture device 102 may also be configured to have a pixel size smaller than 15 micrometers, smaller than 10 micrometers, smaller than 5 micrometers, smaller than 3 micrometers, or smaller than 1.6 micrometer.

In some embodiments, microscope 100 comprises focus actuator 104. The term "focus actuator" as used herein generally refers to any device capable of converting input signals into physical motion or changing ray convergence for adjusting the relative distance between sample 114 and image capture device 102. Various focus actuators may be used, including, for example, linear motors, electrostrictive actuators, electrostatic motors, capacitive motors, voice coil actuators, magnetostrictive actuators, liquid lenses, etc. In some embodiments, focus actuator 104 may comprise an analog position feedback sensor and/or a digital position feedback element. Focus actuator 104 is configured to receive instructions from controller 106 in order to make light beams converge to form a clear and sharply defined image of sample 114. In the example illustrated in FIG. 1, focus actuator 104 may be configured to adjust the distance by moving image capture device 102.

However, in other embodiments, focus actuator 104 may be configured to adjust the distance by moving stage 116, or by moving both image capture device 102 and stage 116. Microscope 100 may also comprise controller 106 for controlling the operation of microscope 100 according to the disclosed embodiments. Controller 106 may comprise various types of devices for performing logic operations on one or more inputs of image data and other data according to stored or accessible software instructions providing desired functionality. For example, controller 106 may comprise a central processing unit (CPU), support circuits, digital signal processors, integrated circuits, cache memory, or any other types of devices for image processing and analysis such as graphic processing units (GPUs). The CPU may comprise any number of microcontrollers or microprocessors configured to process the imagery from the image sensors. For example, the CPU may comprise any type of single- or multi-core processor, mobile device microcontroller, etc. Various processors may be used, including, for example, processors available from manufacturers such as Intel®, AMD®, etc. and may comprise various architectures (e.g., x86 processor, ARM®, etc.). The support circuits may be any number of circuits generally well known in the art, including cache, power supply, clock and input-output circuits. Controller 106 may be at a remote location, such as a computing device communicatively coupled to microscope 100.

In some embodiments, controller 106 may be associated with memory 108 used for storing software that, when executed by controller 106, controls the operation of microscope 100. In addition, memory 108 may also store electronic data associated with operation of microscope 100 such as, for example, captured or generated images of sample 114. In one instance, memory 108 may be integrated into the controller 106. In another instance, memory 108 may be separated from the controller 106.

Specifically, memory 108 may refer to multiple structures or computer-readable storage mediums located at controller 106 or at a remote location, such as a cloud server. Memory 108 may comprise any number of random access memories, read only memories, flash memories, disk drives, optical storage, tape storage, removable storage and other types of storage.

Microscope 100 may comprise illumination assembly 110. The term "illumination assembly" as used herein generally refers to any device or system capable of projecting light to illuminate sample 114.

Illumination assembly 110 may comprise any number of light sources, such as light emitting diodes (LEDs), LED array, lasers, and lamps configured to emit light, such as a halogen lamp, an incandescent lamp, or a sodium lamp. In one embodiment, illumination assembly 110 may comprise only a single light source. Alternatively, illumination assembly 110 may comprise four, sixteen, or even more than a hundred light sources organized in an array or a matrix. In some embodiments, illumination assembly 110 may use one or more light sources located at a surface parallel to illuminate sample 114. In other embodiments, illumination assembly 110 may use one or more light sources located at a surface perpendicular or at an angle to sample 114. Illumination assembly 110 may comprise other optical elements, such as lenses, mirrors, diffusers, active or passive phase elements, intensity elements, etc.

In addition, illumination assembly 110 may be configured to illuminate sample 114 in a series of different illumination conditions. In one example, illumination assembly 110 may comprise a plurality of light sources arranged in different illumination angles, such as a two-dimensional arrangement of light sources. In this case, the different illumination conditions may comprise different illumination angles. For example, FIG. 1 depicts a beam 118 projected from a first illumination angle α1, and a beam 120 projected from a second illumination angle α2. In some embodiments, first illumination angle α1 and second illumination angle α2 may have the same value but opposite sign. In other embodiments, first illumination angle α1 may be separated from second illumination angle α2. However, both angles originate from points within the acceptance angle of the optics. In another example, illumination assembly 110 may comprise a plurality of light sources configured to emit light in different wavelengths. In this case, the different illumination conditions may comprise different wavelengths. In yet another example, illumination assembly 110 may configured to use a number of light sources at predetermined times. In this case, the different illumination conditions may comprise different illumination patterns. Accordingly and consistent with the present disclosure, the different illumination conditions may be selected from a group including: different durations, different intensities, different positions, different illumination angles, different illumination patterns, different wavelengths, or any combination thereof.

Consistent with disclosed embodiments, microscope 100 may comprise, be connected with, or in communication with (e.g., over a network, via dedicated connection (e.g., HDMI, VGA, RGB, Coaxial) or wirelessly, e.g., via Bluetooth or WiFi) user interface 112. The term "user interface" as used herein generally refers to any device suitable for presenting a magnified image of sample 114 or any device suitable for receiving inputs from one or more users of microscope 100. FIG. 1 illustrates two examples of user interface 112. The first example is a smartphone or a tablet wirelessly communicating with controller 106 over a Bluetooth, cellular connection or a Wi-Fi connection, directly or through a remote server. The second example is a PC display or monitor physically connected to controller 106. In some embodiments, user interface 112 may comprise user output devices, including, for example, a display, tactile device, speaker, etc. In other embodiments, user interface 112 may comprise user input devices, including, for example, a touchscreen, microphone, keyboard, pointer devices, cameras, knobs, buttons, etc. With such input devices, a user may be able to provide information inputs or commands to microscope 100 by typing instructions or information, providing voice commands, selecting menu options on a screen using buttons, pointers, or eye-tracking capabilities, or through any other suitable techniques for communicating information to microscope 100. User interface 112 may be connected (physically or wirelessly) with one or more processing devices, such as controller 106, to provide and receive information to or from a user and process that information. In some embodiments, such processing devices may execute instructions for responding to keyboard entries or menu selections, recognizing and interpreting touches and/or gestures made on a touchscreen, recognizing and tracking eye movements, receiving and interpreting voice commands, etc.

Microscope 100 may also comprise or be connected to stage 116. Stage 116 comprises any horizontal rigid surface where sample 114 may be mounted for examination. Stage 116 may comprise a mechanical connector for retaining a slide containing sample 114 in a fixed position. The mechanical connector may use one or more of the following: a mount, an attaching member, a holding arm, a clamp, a clip, an adjustable frame, a locking mechanism, a spring or any combination thereof. In some embodiments, stage 116 may comprise a translucent portion or an opening for allowing light to illuminate sample 114. For example, light transmitted from illumination assembly 110 may pass through sample 114 and towards image capture device 102. In some embodiments, stage 116 and/or sample 114 may be moved using motors or manual controls in the XY plane to enable imaging of multiple areas of the sample.

FIG. 2 depicts an exemplary configuration of a slide loader system 200. As shown in FIG. 2, slide loader system 200 may include a cassette 220 for holding slides 230, a slide loader 240 including an end effector 242, and multiple microscope modules 250 which may optionally be disposed in a cabinet 202. Although not shown in FIG. 2, a processor, such as controller 106 and/or memory 108, may be coupled to slide loader system 200. The processor may be a separate device or may be integrated with slide loader system 200, such as in slide loader 240.

Cassette 220 may comprise a housing for a plurality of slides 230. A user and/or slide loader 240 may insert and remove slides 230 from various slide-holding locations in cassette 220. Although in FIG. 2 cassette 220 is depicted as a cabinet-like structure, in other embodiments cassette 220 may have different shapes and/or structures and may include more than one structure. Each slot or receptacle for a slide 230 may be recognized as a specific location and may be associated with a specific coordinate reference as described herein.

Slide loader 240 may comprise a mechanical device which may include a linkage capable of engaging, retrieving and loading slides 230 into and/or out of cassette 220 and/or microscope modules microscope modules 250 and moving slides 230 therebetween. Prior linkages suitable for use in accordance with the present disclosure are known to one of ordinary skill in the art and may comprise gears, motors, encoders to measure position, and combinations thereof. For example, slide loader 242 may include a mechanical arm capable of moving between cassette 220 and microscope modules 250. Slide loader 240 may include end effector 242 configured to engage slides 230. End effector 242 may comprise a mechanical device capable of engaging and holding one or more slides 230 at a time. For example, end effector 242 may include fingers and/or grips capable of grasping, adhesive elements, vacuum holder, a surface for resting the slide, etc. In some embodiments, slide loader 240 may include multiple end effectors 242. The multiple end effectors 242 may each be capable of retrieving and loading slides 230, or may be specialized for particular tasks, for instance a separate end effector 242 for retrieving and another for loading.

Each of the plurality of microscope modules 250 may include a scanning device, such as microscope 100. Microscope modules 250 may include similar types of microscopes or may include various types or classes of microscopes, including microscopes capable of different resolutions. For instance, a microscope module of the plurality of modules 250 may comprise an optical microscope configured to image tissue with a resolution of 100 μm, 10 μm, 1 μm, 0.5 μm, 0.2 μm, 0.1 μm or less, or within a range defined by any two of the preceding values. For example, the resolution of the microscope may be within a range from 0.1 μm to 10 μm, 0.1 μm to 0.2 μm, 0.1 μm to 0.5 μm, etc. A microscope module of the plurality of modules 250 may include an illumination array having multiple illumination sources configured to illuminate a sample under various illumination conditions at various times. Other examples of a microscope module among the plurality of modules 250 include a high definition microscope, a digital microscope, a computational microscope, a 3D microscope, a phase imaging microscope, a phase contrast microscope, a dark field microscope, a differential interference contrast microscope, a lightsheet microscope, a confocal microscope, a holographic microscope, and a fluorescence-based microscope. Each of the plurality of microscope modules 250 may image a respective slide among slides 230. A slide can be placed in a specific microscope module of the plurality of modules 250 independently from other microscope modules of the plurality of modules 250. The plurality of microscope modules 250 may be modular in that microscope modules 250 may be added and/or removed from slide loader system 200. Slide loader system 200, one of microscope modules 250, and/or a separate device which may be local or remote, may track which microscope modules 250 are attached and available and readjust as microscope modules 250 are added or removed or a user may initiate the configuration slide loader system 200 with the details of the change.

Microscope modules 250 may comprise their own respective memory and/or processing units or may share memory and/or processing units, which may be remote such as a separate device, or local to some or all microscope modules 250. In some embodiments, slide loader system 200 may share or communicate with the computing resources of microscope modules 250, in order to manage and prioritize loads between the shared computing resources of microscope modules 250.

Microscope modules 250 may be designed to facilitate interchangeability. As seen in FIG. 2, microscope modules 250 may have a block-like structure to allow stacking in any configuration. A microscope module 250 may be swapped out for another microscope module 250 or left empty. Although in other embodiments microscope modules 250 may have different shapes/structures. In addition, microscope modules 250 may be arranged in any layout or configuration. For example, FIG. 2 shows six microscope modules 250 in a 2×3 arrangement. As described further herein, other arrangements may be possible due to the modularity of microscope modules 250 or by design.

In FIG. 2, microscope modules 250 may be disposed in an optional cabinet 202. Cabinet 202 may be shaped to house multiple microscope modules 250. In some embodiments, cabinet 202 may include shelves or supports for each level of microscope modules 250, such that microscope modules 250 are not directly stacked. In some embodiments, cabinet 202 may include electrical connectors or other necessary connectors such as communication connectors for microscope modules 250, for example for coupling to the processor of slide loader system 200.

Slide loader 240 may be configured to locate slides 230 and microscope modules 250 based on a coordinate system. In FIG. 2, the coordinate system may correspond to the illustrated x, y, and z-axes. Each location, such as locations of receptacles in cassettes 220 and locations of stages for each microscope of the plurality of modules 250, may be tracked using coordinates in the coordinate system. Although a 3-dimensional Cartesian coordinate system is described, in other embodiments the coordinate system may be different, such as a 2-dimensional coordinate system, a polar coordinate system (see e.g., FIG. 5F), etc. The coordinate system may correspond to movement capabilities and/or degrees-of-freedom of slide loader 240. In FIG. 2, slide loader 240 may move along the three labeled axes, x, y, and z.

The controller comprising the processor as described herein can be configured with instructions coordinate movement of the slide loader to place the microscope slides in the appropriate module comprising a specific microscope. For example, the location of each slide in the cassette may comprise a specific coordinate location associated with a unique identifier. The location where each microscope among the plurality receives a slide may comprise a specific coordinate reference associated with specific microscope in a module, and each microscope may comprise a unique identifier. The processor as described herein can be configured with instructions to move a specific microscope slide at a specific location in a cassette to a specific microscope module in response to the microscope slide in the cassette and the type or class of the microscope to which the microscope slide has been assigned with prioritization as described herein. In some embodiments, each slide may comprise a unique identifier to track movement of the slide among the plurality of slides and modules and cassettes.

FIG. 3 illustrates an exemplary workflow 300 for managing multiple microscope modules with a slide loader, such as slide loader system 200 or any other embodiment described herein. At block 310, a slide may be placed in a designated location. The designated location may include an empty receptacle in cassette 220. A user may place slide 230 into cassette 220. Alternatively, slide 230 may be placed, for example, by a separate device for loading slides into cassette 220. In yet other embodiments, slide 230 may be placed by slide loader 240, for instance if slide loader system 200 shuffles or rearranges slides 230 or slide 230 is placed back into cassette 220 after a prior iteration of scanning.

In some embodiments, certain receptacles in cassette 220 may be reserved for loading new slides for slide loader system 200. The receptacles may be divided into groups based on priority or scan need. For example, certain receptacles may be reserved for high priority slides. Certain receptacles may be reserved based on scan need which may be satisfied by particular microscope modules 250, such as high-resolution scan need for a high-resolution microscope. Slide loader system 200 may track which slides 230 are in which particular receptacle and may track whether a slide 230 is in a reserved receptacle. Alternatively or in combination, each of the slides may comprise a unique identifier, and the prioritization of the slide determined in response to the unique identifier.

To further aid in tracking slides, each receptacle may correspond to a location. The location may correspond to coordinates or may be represented as other types of data which slide loader system 200 may use to move slide loader 240 to desired positions. In some embodiments, each location may be tracked such that slide loader system 200 may track whether a particular location is empty or holds a specific slide 230.

A new slide may be detected and identified. At block 320A, a sensor may detect the slide. The sensor may be placed, for example, on cassette 220, slide loader 240, and/or on one or more of microscope modules 250 and/or cabinet 202. The sensor may be capable of detecting and/or identifying slides. For example, the sensor may comprise a camera, a barcode reader, or a laser scanner. In some embodiments, the sensor may also be capable of capturing a preview image of the slide. Slide 230 may be detected in cassette 220, slide loader 240, or one of the microscope modules 250.

Each slide 230 may be associated with a unique identifier. The sensor may be capable of detecting the unique identifier. For example, the unique identifier may be represented by a barcode on slide 230. Other examples of identifying the slide include reading an optical character recognition code, optical character recognition, radio-frequency identification (RFID) tag, user input, preview image, or other suitable identification. Slide loader system 200 may associate the unique identifier with the current location of the corresponding slide 230. The unique identifier may allow slide loader system 200 to retrieve additional information about a particular slide 230.

The information may include attributes and/or parameters which slide loader system 200 may use for managing slides 230. The information may include priority information such that slide loader system 200 may compare priorities of slides 230. In some embodiments, the priority information may be based on which location slide 230 was placed. The information may include user defined information which was input by the user, such as a particular instruction for scanning. Alternatively, the information may include a sequence or order the particular slide 230 was detected. For example, the information may include a timestamp of first being detected, or may include an order number, which may be one greater than the previously-detected slide 230.

The information may be based on other known attributes of slide 230. For example, the information may include information as to a type of sample in slide 230. Based on the type of sample, slide loader system 200 may determine priority and/or scanning needs. For example, if a slide 230 included a frozen tissue sample, slide loader system 200 may determine a high priority so as to scan slide 230 before the frozen tissue sample melts or condensation forms or in a clinically required time period, in accordance with some embodiments.

Similar to slides 230, microscope modules 250 may have unique identifiers which may be associated with additional information. Microscope modules 250 may be identified based on detection by a sensor, similar to slides 230. In some embodiments, microscope modules 250 may include their own computer, microprocessor, and/or sensor, and electrical connectors for coupling to the processor of slide loader system 200. In such embodiments, each of the plurality of microscope modules 250 may send unique identifier and/or additional information associated with the microscope located within the module. The additional information may include information regarding the scanning capabilities of the respective microscope module 250, a current status (e.g., free, busy, error, etc.) and parameters regarding the respective microscope module 250. The parameters may correspond to where slides 230 should be inserted and may include height, location, angles such as roll, pitch, and yaw, direction, size, depth, etc.

At block 330, the loader may retrieve the slide. Slide loader 240 may move to the slide's location and end effector 242 may engage and retrieve the slide in response to instructions from the controller comprising the processor.

In some embodiments, the slide may be selected for retrieval. For instance, after detecting and identifying the slide, information about the slide may be retrieved. The slide may then be selected based on the information. The slide may be selected based on priority (340A), user definition (340B), sequentially (340C), clinical relation to other slides, or some combination thereof. For instance, slide loader system 200 may select the next highest priority slide 230. The next highest priority slide may be determined based on information associated with one or more of the plurality of slides 230. Slide loader 240 may then move to the location associated with the selected slide 230. Alternatively, priority may be determined based on location, such that slide loader 240 may move to the first filled high priority receptacle. For user-defined selection, the user definition may point out particular slides 230 for scanning in a particular sequence or may provide customized guidelines for selecting slides 230. For sequential selection, slides 230 may be selected sequentially, such as a first-in-first-out (FIFO) queue.

At block 350, the loader may place the slide in an available module. After engaging the selected slide 230 using end effector 242, slide loader 240 may move to an appropriate microscope module 250. Slide loader system 200 may select the appropriate microscope module 250.

Slide loader system 200 may detect and identify what microscope modules 250 are available in the system. As described herein, detection may include sensor-based detection of microscope modules 250 and/or communication from microscope modules 250. Microscope modules 250 may then be identified and corresponding information retrieved, as described above. Scan capabilities of microscope modules 250 may also be determined. Slide loader system 200 may maintain an index of available microscope modules, which may include scan capabilities and locations, which may be associated with unique identifiers as described herein. In some embodiments, microscope modules 250 may be changed and/or rearranged, slide loader system 200 may update the index of available microscope modules. The update may happen, for instance, when a change is detected or requested, such as detecting a new microscope module 250 or absence of a microscope module 250. Microscope modules 250 may be removed and replaced with other microscope modules 250 such that locations may be updated for the new microscope module 250. Alternatively, microscope modules 250 may be removed, disabled, in a calibration or testing mode, in a maintenance operation, or otherwise unavailable. The update may happen periodically, such as once per day, hour, etc. Each microscope module may be associated with a unique identifier, which is associated with data for the microscope such as the microscopes scanning capabilities as described herein.

The appropriate microscope module 250 may be selected based on the scan needs of selected slide 230. A microscope module 250 that meets or exceeds the scan needs and is also available may be selected. For example, a first microscope module 250 may be of a first class and a second microscope module 250 may be of a second class. The scan needs may require the first class of microscope and thus the first microscope module 250 may be selected. If more than one microscope module 250 can satisfy the scan needs, a particular microscope module 250 may be selected based on other factors, such as selecting the least capable microscope module 250 that satisfies the scan needs, load balancing, minimizing distance for slide loader 240 to move, expected load based on detected slides 230, managing computing and other resources shared by microscope modules 250, etc.

The slide may be placed in an available module using communication with a module or a processor connected to the module (360A), a sensor on the loader (360B), based on predefined time and/or sequence (360C), or a combination thereof. For example, the coordinates for the location of a stage of the selected microscope module 250 along with other parameters may be determined for example communicating with the selected microscope module 250. Slide loader 240 may adjust loading selected slide 230 into selected microscope module 250 based on the parameters, such as shifting slide loader 240 to more accurately insert slide 230 into microscope module 250. A sensor on slide loader 240 may be used to assist end effector 242 in correctly aligning with microscope module 250. A predefined time and/or sequence may determine a direction and duration for slide loader 240 to move from one particular location to another particular location, akin to dead-reckoning navigation.

At block 370, after scanning is complete, the loader may retrieve the slide. Slide loader 240, using end effector 242, may engage and remove slide 230 from microscope module 250.

The microscope modules may be configured to transmit a signal to a processor indicating that the module has completed imaging of a slide on the module and is ready for removal of the slide on the module and receiving another slide. For example, when microscope module 250 completes scanning slide 230, microscope module 250 may communicate to the processor of slide loader system 200. In some embodiments, the communication may include, for instance, a success and/or error message. In other embodiments, the communication may indicate whether the microscope module is currently scanning or not. In some embodiments, rather than communicating completion, the completion may be assumed after a predetermined amount of time, corresponding to a time to complete associated with the scan needs, elapses.

In some embodiments, more than one microscope module 250 may be finished such that more than one slide 230 is ready for retrieval. Slide loader system 200 may select which slide 230 to retrieve based on other factors, such as priority as described herein. For example, slide 230 having the highest priority may be retrieved.

Slide loader system 200 may further coordinate retrieval of slide 230 from microscope module 250. The retrieval may use communication with the module or processor connected to the module (380A), use a sensor on the loader (380B), based on a predefined time and/or sequence (380C), or a combination thereof.

Microscope module 250 and/or a processor coupled to microscope module 250 may communicate parameters and/or other data to aid slide loader 240 accurately maneuver end effector 242 for retrieving slide 230. Alternatively, a sensor on slide loader 240 may provide additional feedback for engaging slide 230. In other embodiments, slide loader 240 may move according to a predefined direction and/or duration corresponding to the location for retrieving slide 230.

At block 390, the loader may place the slide. For instance, slide loader 240 may place slide 230 back into cassette 220 after retrieving slide 230 from microscope module 250. The location where slide 230 is placed may be determined, for example, using the same initial location (395A), a location based on sequence, slide ID, and/or user definition (395B), a clinical relation such as slides relating to the same case, or a slide collection area (395C).

The location may be the same location from which slide 230 was originally retrieved. For instance, slide 230's location may be saved with slide 230's identifier when retrieved in order to be replaced in the same receptacle of cassette 220. In some embodiments, slide loader 200 may track the locations such that if another slide 230 was detected in the location before the original slide 230 can be returned, slide loader 200 may take action to prevent double loading of a receptacle. For example, slide loader 200 may move the extra slide 230 to another receptacle and reassign its location or slide loader 200 may select a different empty receptacle, which may be near the original location, for returning the original slide 230.

In addition, slide loader 200 may place the original slide 230 in a different location for other reasons. For instance, slide 230, having been scanned by one or more of the modules, may now have a lower priority than other slides 230 and thus placed into a lower priority location of cassette 220, or a completed scan location of cassette 220. Other information associated with slide 230 may be used to determine the location. The location may also be based on a user-defined location. The user may have designated a specific location for slide 230 to be placed or the user may have input general rules for placing completed slides 230, such as placing them below slides 230 that have yet to be scanned.

The location may be based on a sequentially selected available location in the cassette. For example, as cassette 220 empties out, such as from the top, the next empty receptacle may be selected.

Alternatively, slide 230 may be placed in a specified slide collection area for collecting slides that have been scanned. The slide collection area may be reserved receptacles in cassette 220 or may be a different area.

The workflow 300 may comprise a method for managing multiple microscope modules with a slide loader, and each of the blocks of workflow 300 may comprise steps of the method for adaptive sensing of the sample. The steps of workflow 300 may be performed in a different order or interrupted with other iterations of workflow 300. For example, many slides 230 may first be loaded into microscope modules 250 before being retrieved. In other words, at any given moment, slide loader 200 may determine, based on factors described herein, whether and where to load or retrieve any slide 230 in the system.

FIG. 4 is a flowchart of an exemplary process 400 for managing multiple microscope modules with a slide loader. The steps of process 400 may be performed by a slide loader system, such as slide loader system 200 or other embodiments described herein. In the following description, reference is made to components of slide loader system 200 for purposes of illustration. It will be appreciated, however, that other implementations are possible and that other components may be utilized to implement the example process. For example, FIGS. 5A-5F illustrate various slide loader systems 500A-500F (any of which may also individually be referred to as slide loader system 500), any of which may correspond to slide loader system 200.

Figure 5A:
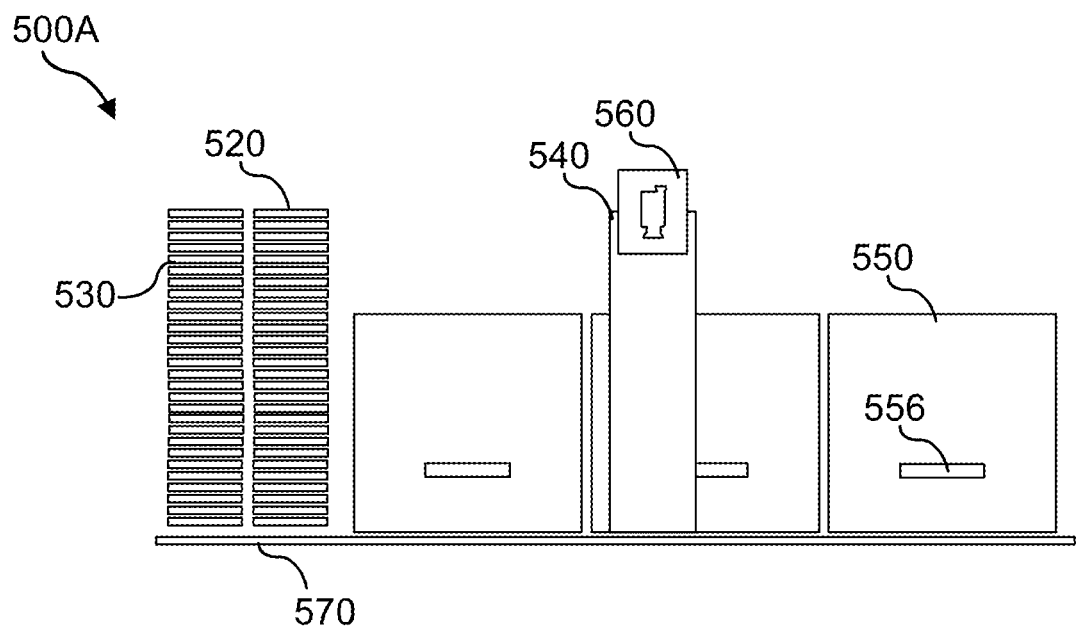
FIGS. 5A-5F are diagrams of exemplary slide loader and microscope scanning module arrangements, in accordance with some embodiments of the present disclosure.

FIGS. 5A-5F show slide loader systems 500A-500F (which may correspond to slide loader system 200), respectively, which may include a cassette 520 (which may correspond to cassette 220), slides 530 (which may correspond to slides 230), slide loader 540 (which may correspond to slide loader 240), end effector 542 (which may correspond to end effector 242), a plurality of microscope modules 550 (which may correspond to microscope modules 250), stage 556, sensor 560, and base 570. Cassette 520, which may correspond to cassette 220, may include receptacles for holding slides 530. In FIG. 5A, cassette 520 includes two towers, although other configurations may be used. In FIG. 5A, slide loader 540 includes sensor 560, which may be a camera or other sensor described herein. Microscope module 550 may include stage 556 which holds slides 230.

Base 570 may comprise an alignment structure which may align microscope modules 550, cassette 520, and/or slide loader 540. Base 570 may facilitate alignment of the various locations (e.g., receptacles of cassette 520 and stages 556 of microscope modules 550) with slide loader 540 with respect to the coordinate reference points used by slide loader 540. Base 570 may ensure that cassette 520, slide loader 540, and microscope modules 550 remain static with respect to each other, or otherwise prevent components from being displaced, which may interfere with the coordinates used by slide loader 540.

In some embodiments, base 570 may comprise a structure on which one or more of cassette 520, slide loader 540, and microscope modules 550 may be disposed. For example, slide loader systems 500A, 500B and 500C may include this base 570. In some embodiments, base 570 may comprise a rail or path along which slide loader 540 may move. For example, slide loader system 500E includes this base 570. In some embodiments, base 570 may be a guide for placement of cassette 520, slide loader 540, and/or microscope modules 550. In some embodiments base 570 may comprise a portion of the linkage. Alternatively or in combination, the base 570 can maintain alignment of the microscope modules with respect to the cassette.

Figure 5B:
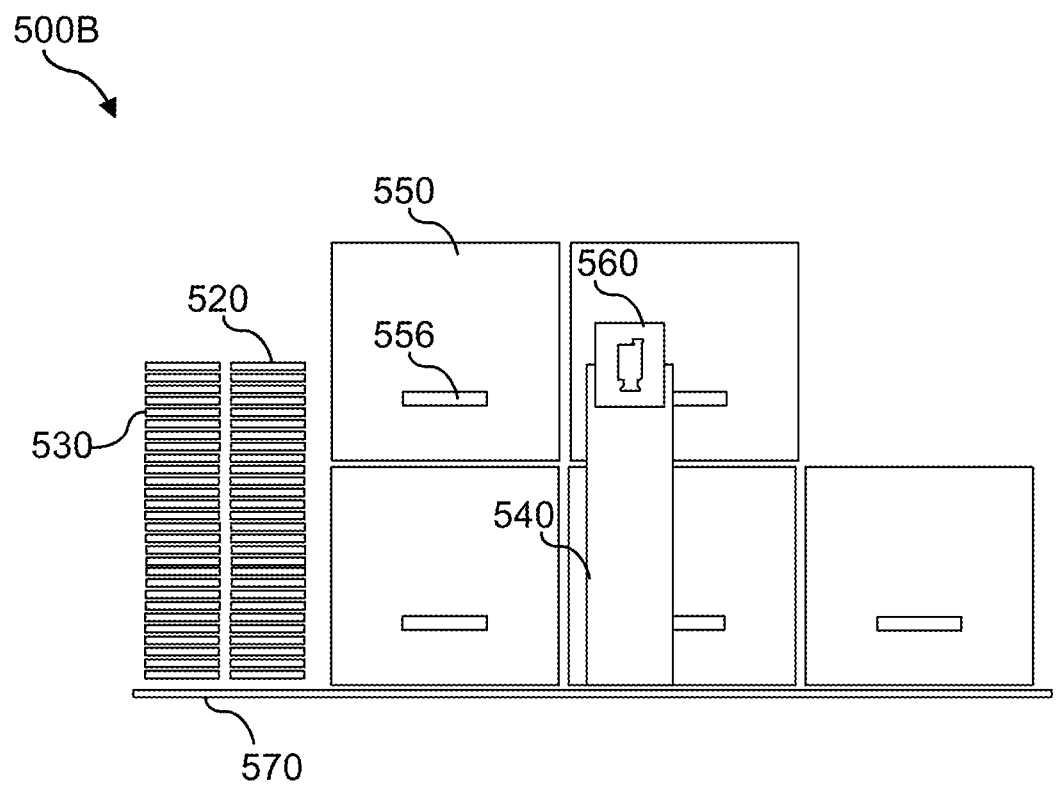

FIGS. 5A-5F illustrate various embodiments of slide loader systems. FIGS. 5A and 5B show that sensor 560 may be disposed on slide loader 540. The sensor 560 may comprise any sensor as described herein. The placement of sensor 560 may ensure that sensor 560 may detect microscope modules 550 at different heights. For instance, in FIG. 5A there is only one row of microscope modules 550 but in FIG. 5B there are two rows, requiring sensor 560 to detect microscope modules 550 at two heights. As further seen in FIG. 5B, microscope modules 550 may be stacked in incomplete rows. The sensor and end effector can be configured to move with the coordinate references in response to the processor coupled to the linkage as described herein. For example, the sensor and end effector can be moved in lateral and transverse directions such as upward and downward.

Figure 5C:
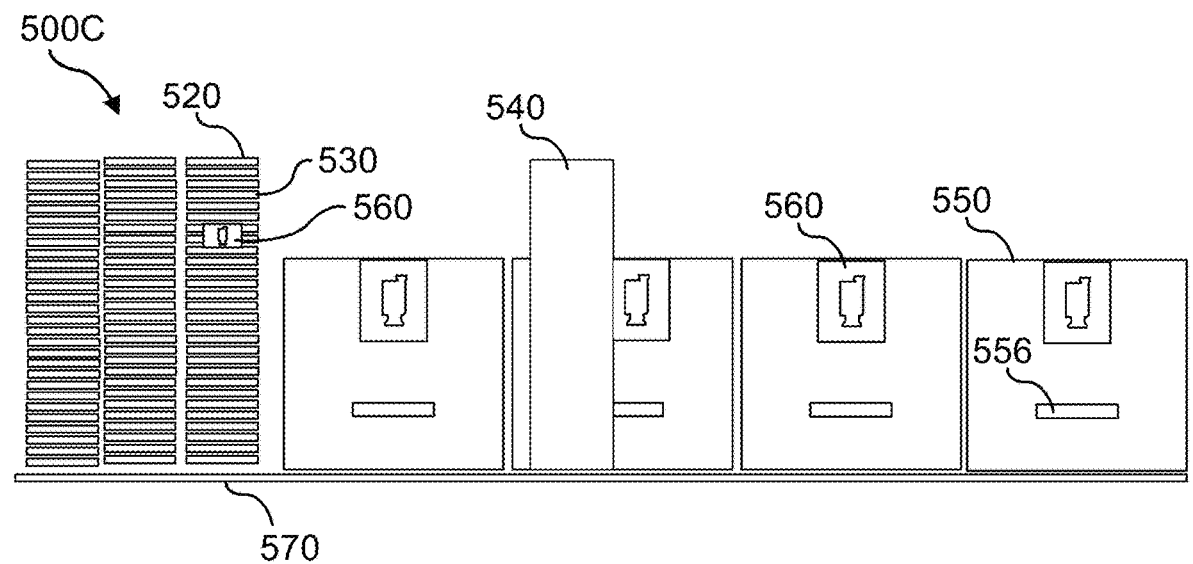
Figure 5D:
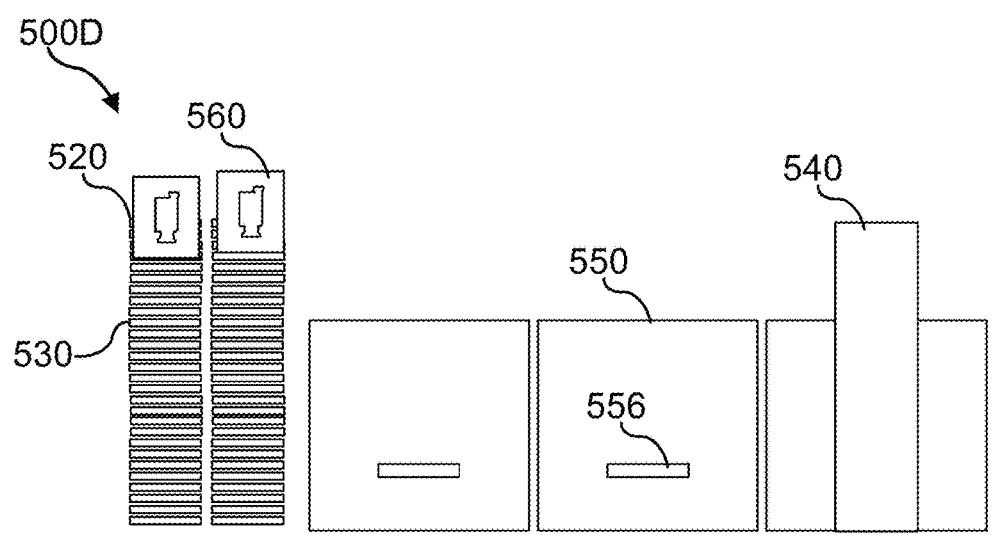
Figure 5E:
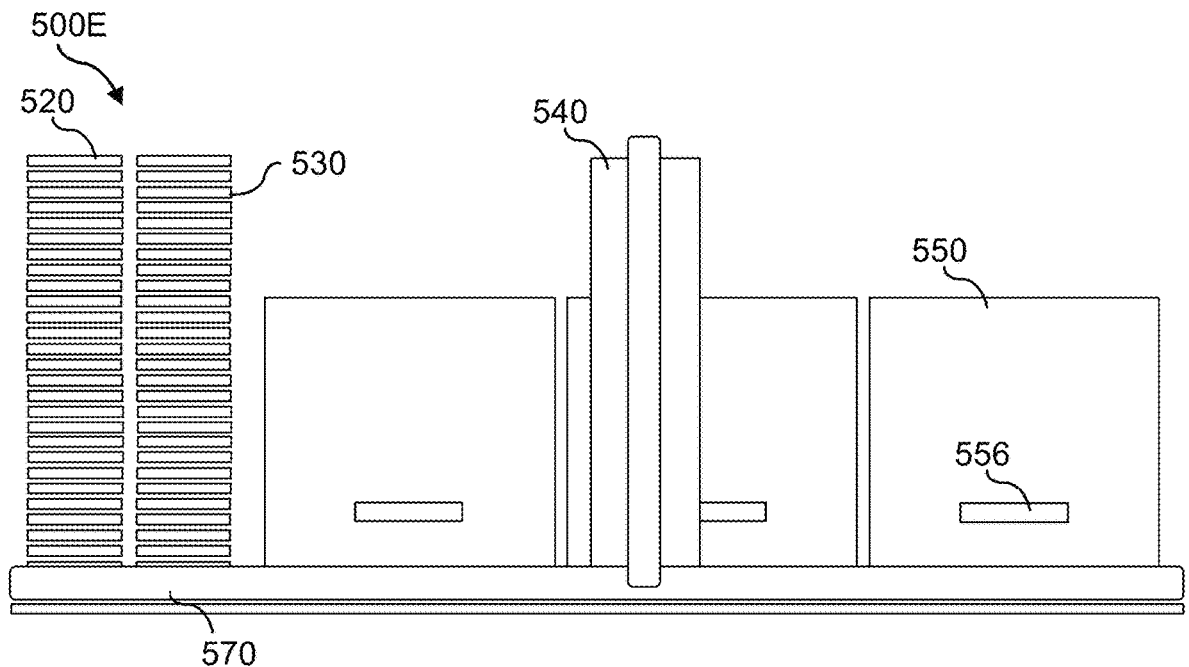

FIG. 5C shows that sensor 560 may be mounted on microscope module 550 and another sensor 560 may be mounted on cassette 520. FIG. 5D shows that each structure of cassette 520 may include its own sensor 560. FIG. 5E shows how base 270 may be a rail-like structure along which slide loader 540 traverses. Slide loader 540 may also include a z stage component such that end effector 542 may move vertically.

Figure 5F:
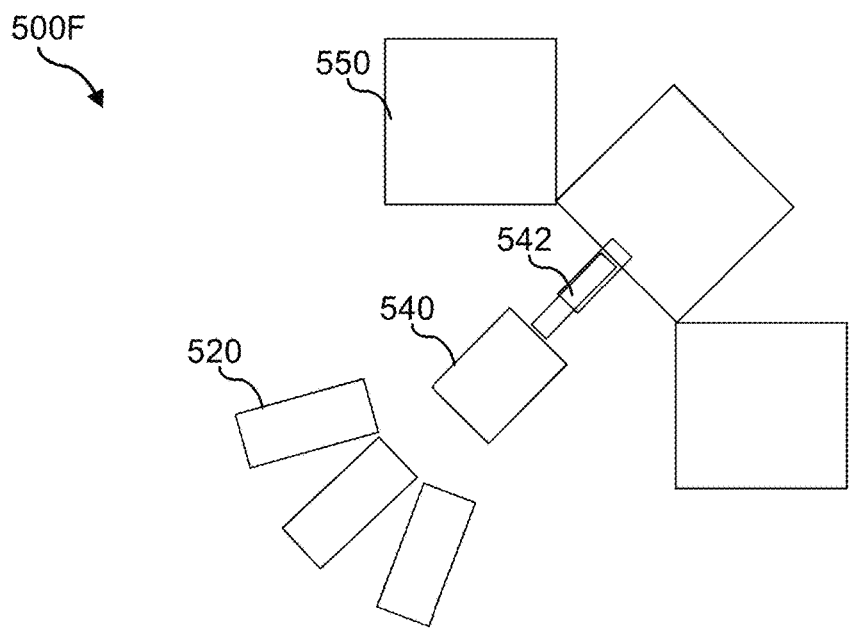

FIG. 5F shows an alternative layout for slide loader system 500F. In FIG. 5F, slide loader 540 may be configured to move radially. For instance, end effector 542 may be attached to an arm capable of moving vertically up and down, and slide loader 540 may rotate to move the arm between cassettes 520 and microscope modules 550. With this slide loader 540, cassette 520 and microscope modules 550 may be placed radially around slide loader 540. Other layouts may be used based on movement range and degrees-of-freedom of slide loader 540.

Returning to FIG. 4, at step 410, a slide may be selected among a plurality of slides for scanning. Slide loader system 500 may select one of slides 530 based on one or more factors as described herein. In some embodiments, slide 530 may be automatically selected, for example, when slide loader system 500 determines that selected slide 530 should be next loaded into microscope module 550. In some embodiments, slide loader system 500 may have been instructed, such as by the user, to select slide 530. By selecting slide 530, slide loader system 500 may more efficiently scan all slides 530 than a FIFO queue while complying with priority and scan needs.

At step 420, the selected slide may be retrieved. Slide loader 540 may move from its current location to the location of selected slide 530. Coordinates for the location of slide 530 may be used to determine how far and in what direction to move slide loader 540. Slide loader 540 may then engage slide 530 using end effector 542. End effector 542 may extend from slide loader 540, for instance extend a distance based on the coordinates of the location, and engage slide 530. End effector 542 may include mechanical appendages for grasping and/or adhesive surfaces to aid in engagement, a vacuum holder, a surface for holding and/or supporting slide 530, etc. End effector 542 may retract away from the location and slide loader 540 may be prepared to move to a destination for slide 530.

At step 430, a module of a plurality of modules may be selected. Slide loader system 500 may select a specific microscope module 550. Microscope module 550 may be selected based on slide 530 in order to meet its scan needs. However, rather than merely selecting any available microscope module 550 that may satisfy slide 530's scan needs, slide loader system 500 may further optimize usage of microscope modules 550 by considering other factors. For instance, by knowing what slides 530 are in the system and their respective scan needs, slide loader system 500 may predict or estimate a possible workload for each microscope module 550. In some embodiments, one or more microscope modules 550 may be coupled to a processor, such as a graphics processing unit (GPU), which may perform computational analysis for the coupled microscope modules 550. Microscope module 550 may be selected to more efficiently allocate computing resources, such as processing on the GPU. For example, a microscope module 550 coupled to an idle GPU may be selected over a microscope module 550 coupled to a busy GPU. Alternatively, microscope module 550 may be selected based on estimated time to complete predicted workloads such that overhead or bottlenecks may be minimized.

In some embodiments, microscope module 550 may be previously selected before slide 530. For instance, a particularly busy microscope module 550 may have just completed a scan and has been unloaded. Slide loader system 500 may determine that this particular microscope module 550 should be loaded next and may accordingly select slide 530.

In some embodiments, slide loader system 500 may provide further instructions to microscope module 550. For example, slide loader system 500 may communicate the ID and/or additional information of slide 530 to microscope module 550 so that microscope module 550 may determine how to scan slide 530. Slide loader system 500 may communicate the scan needs of slide 530. Alternatively, slide loader system 500 may communicate explicit scanning instructions to microscope module 550. In some embodiments, the scanning instructions, which may be based on the scan needs of slide 530, from slide loader system 500 may override normal operation of microscope module 550. For instance, the scanning instructions may include throttling or other modifications in order to efficiently utilize all computing resources available to microscope modules 550.

At step 440, the selected slide may be loaded into the selected module. Slide loader system 500 may move slide loader 540 to the location corresponding to selected microscope module 550. Slide loader 540 may move to stage 556 of microscope module 550 and extend end effector 542 to stage 556. End effector 542 may drop or disengage slide 530 to load slide 530 onto stage 556.

At step 450, the slide may be retrieved from the module after the module scans the slide. Slide loader 540 may move back to the location corresponding to selected microscope module 550 and extend end effector 542 towards stage 556. End effector 542 may engage slide 530, remove slide 530 from stage 556, and retract away from stage 556. Slide loader 540 may then move slide 530 to another location for drop off.

In some embodiments, microscope module 550 may communicate when scanning slide 530 is complete. Microscope module 550 may send a signal when scanning is complete or may indicate that it is no longer scanning. In some embodiments, sensor 560 may detect when microscope module 550 completes scanning. In some embodiments, slide loader system 500 may assume microscope module 550 has completed scanning after a predetermined amount of time, which may be associated with microscope module 550, has elapsed. In such embodiments, stage 556 may lock slide 530 to prevent premature retrieval.

Any of the steps of method 400 can be combined with any method step corresponding to a block of workflow 300 as described herein. Although workflow 300 and method 400 are described as a sequence of steps, in some embodiments various concurrent iterations may result in steps being stalled, repeated, and/or performed in different orders. Slide loader system 500 may be constantly loading and retrieving slides 530 as more slides 530 are added and other slides 530 complete scanning by microscope modules 550. In addition, slide loader system 500 may be constantly monitoring for changes to slides 520 and/or microscope modules 550. Slide loader system 550 may operate regardless of changes to microscope modules 550. The processor as described herein can be configured with instructions to perform any step of any method as described herein.

A user may be able to load slides into a cassette of a slide loader system or directly into one of the microscope modules of the slide loader system. The user may provide identification and/or information for each slide, for example by affixing a barcode to each slide or inputting information to a database connected to the slide loader system. The slide loader system may then take inventory of the slides as well as where they are located (e.g., in a cassette, a microscope module, other area, etc.) along with which microscope modules are connected and available. The slide loader system may prioritize the slides using the factors and signals described herein, and may further match slides to appropriate microscope modules, based on scan needs and other factors. The slide loader may then proceed to retrieve and load slides based on the prioritization and matching. The slide loader system may constantly monitor the slides and microscope modules and react accordingly to changes in status, such as scan completion, removal/addition of microscope modules, etc. For example, the user may load a slide into an available microscope module. The slide loader system may detect these changes and readjust load balancing of other slides to accommodate these changes. The slide loader system may further "take over" and manage the user-inserted slide and corresponding microscope module by monitoring a completion status and removing the slide when complete. Thus, embodiments described herein may provide automated management of scanning multiple slides with multiple microscope modules using a slide loader.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or comprise additional steps in addition to those disclosed.

The processor as disclosed herein can be configured to perform any one or more steps of a method as disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

This disclosure also includes the following numbered clauses:

Clause 1. A microscope system comprising: a plurality of microscope modules; a cassette for holding a plurality of slides; a slide loader configured to move the plurality of slides between the cassette and the plurality of microscope modules; and a processor coupled to the slide loader, the processor configured with instructions which, when executed, cause the slide loader to: move a slide into or from a selected microscope module among the plurality of microscope modules.

Clause 2. The microscope system according to clause 1, wherein the processor is configured with instructions to: select a slide among the plurality of slides for scanning; retrieve the selected slide from the cassette; select a microscope module of the plurality of microscope modules; load the slide into the selected microscope module; and after the microscope module scans the slide, retrieve the slide from microscope module.

Clause 3. The microscope system according to any of clauses 1 or 2, wherein the slide loader comprises a linkage coupled to the processor to move the plurality of slides to the plurality of modules in response to instructions from the processor, to retrieve the plurality of slides from the plurality of modules, and to place the plurality of slides on the slide loader in response to instructions from the processor.

Clause 4. The microscope system according to any of clauses 1 to 3, wherein the plurality of microscope modules comprises a plurality of locations to receive the plurality of microscope slides and wherein each of the plurality of locations corresponds to one of the plurality of microscope modules and comprises a location separate from other locations of the plurality of locations and wherein the linkage is configured to place one or more of the plurality of slides at said each of the plurality of locations in response to instructions from the processor.

Clause 5. The microscope system according to any of clauses 1 to 4, wherein the processor is configured with a plurality of coordinate references corresponding to the plurality of locations and wherein the processor is configured with instructions to place each of the plurality of slides at a location among the plurality of locations based on the plurality of coordinate references and an identifier of the slide.

Clause 6. The microscope system according to any of clauses 1 to 5, further comprising an end effector coupled to the linkage and the processor, the end effector configured to engage a slide among the plurality of slides, remove the slide from the cassette, disengage the slide at a location among the plurality of locations, engage the slide at the location among the plurality of locations, remove the slide from the location, and place the slide on the cassette.

Clause 7. The microscope system according to any of clauses 1 to 6, further comprising a plurality of end effectors each coupled to the linkage and the processor and configured to engage and disengage the slide.

Clause 8. The microscope system according to any of clauses 1 to 7, wherein: the plurality of microscope modules comprises a first microscope module comprising a first class of microscope and a second microscope module comprising a second class of microscope, the first class and second class are selected from the group consisting of a high definition microscope, a digital microscope, a computational microscope, a 3D microscope, a phase imaging microscope, a phase contrast microscope, a dark field microscope, a differential interference contrast microscope, a lightsheet microscope, a confocal microscope, a holographic microscope and a fluorescence-based microscope, the processor is configured to select between the first class and the second class based on the slide, and the instructions cause the slide loader to move the slide to the first microscope module or the second microscope module in response selecting between the first class and the second class.

Clause 9. The microscope system according to any of clauses 1 to 8, wherein the instructions further comprise instructions for: detecting the slide; identifying the slide; retrieving information about the identified slide; and selecting, based on the information, the slide.

Clause 10. The microscope system according to any of clauses 1 to 9, wherein detecting the slide comprises detecting the slide in at least one of the cassette, the slide loader, or one of the plurality of microscope modules.

Clause 11. The microscope system according to any of clauses 1 to 10, wherein identifying the slide comprises reading at least one of a unique identifier, a bar code, an optical character recognition code, optical character recognition, a radio-frequency identification (RFID) tag, a user input, or a preview image of the slide.

Clause 12. The microscope system according to any of clauses 1 to 11, wherein the information comprises a priority for the slide and selecting the slide comprises selecting the slide based on comparing the priority to priorities of other slides in the cassette.

Clause 13. The microscope system according to any of clauses 1 to 12, wherein the information comprises a user-defined selection and selecting the slide comprises selecting the slide based on the user-defined selection.

Clause 14. The microscope system according to any of clauses 1 to 13, wherein the information comprises an order in a queue of slides in the cassette and selecting the slide comprises selecting the slide based on the order.

Clause 15. The microscope system according to any of clauses 1 to 14, further comprising a sensor for detecting and identifying slides.

Clause 16. The microscope system according to any of clauses 1 to 15, wherein the sensor comprises at least one of a camera, a barcode reader, or a laser.

Clause 17. The microscope system according to any of clauses 1 to 16, wherein the sensor is located on at least one of the cassette, the slide loader, or one of the plurality of microscope modules.

Clause 18. The microscope system according to any of clauses 1 to 17, wherein the sensor is configured to capture a preview image of the slide.

Clause 19. The microscope system according to any of clauses 1 to 18, wherein the instructions comprise instructions for selecting the selected microscope module, comprising: identifying each of the plurality of microscope modules; determining a scan capability for each of the plurality of microscope modules; determining a scan need for the slide; and selecting the microscope module based on the scan capability of the selected microscope module satisfying the scan need of the slide.

Clause 20. The microscope system according to any of clauses 1 to 19, wherein identifying each of the plurality of microscope modules comprises determining coordinates for each of the plurality of microscope modules.

Clause 21. The microscope system according to any of clauses 1 to 20, wherein loading the slide into the selected microscope module comprises loading the slide when the selected microscope module is available.

Clause 22. The microscope system according to any of clauses 1 to 21, wherein moving the slide into or from the selected microscope module comprises communicating with the selected microscope module.

Clause 23. The microscope system according to any of clauses 1 to 22, wherein moving the slide into or from the selected microscope module comprises using a sensor on at least one of the slide loader or the selected microscope module.

Clause 24. The microscope system according to any of clauses 1 to 23, wherein moving the slide into or from the selected microscope module comprises loading the slide into or retrieving the slide from the selected microscope module based on a predefined timing sequence for the selected microscope module.

Clause 25. The microscope according to any of clauses 1 to 24, wherein retrieving the slide from the selected microscope module comprises retrieving the slide when the slide has a highest priority of slides to be retrieved from the microscope modules or the cassette.

Clause 26. The microscope system according to any of clauses 1 to 25, wherein retrieving the slide from the selected microscope module comprises communicating with the selected microscope module.

Clause 27. The microscope system according to any of clauses 1 to 26, wherein retrieving the slide from the selected microscope module comprises using a sensor on at least one of the slide loader or the selected microscope module.

Clause 28. The microscope system according to any of clauses 1 to 27, wherein the processor is further configured to execute instructions which cause the slide loader to replace the slide into the cassette after retrieving the slide from the selected microscope module.

Clause 29. The microscope system according to any of clauses 1 to 28, wherein the slide loader replaces the slide into a location in the cassette from which the slide loader previously retrieved the slide.

Clause 30. The microscope system according to any of clauses 1 to 29, wherein the slide loader replaces the slide into a location in the cassette different from where the slide loader previously retrieved the slide.

Clause 31. The microscope system according to any of clauses 1 to 30, wherein the location is determined based on a sequentially selected available location in the cassette.

Clause 32. The microscope system according to any of clauses 1 to 31, wherein the location is determined based on information associated with the slide.

Clause 33. The microscope system according to any of clauses 1 to 32, wherein the location is determined based on a user-defined location.

Clause 34. The microscope system according to any of clauses 1 to 33, wherein the processor is further configured to execute instructions which cause the slide loader to place the slide in a slide collection area after retrieving the slide from the microscope module.

Clause 35. The microscope system according to any of clauses 1 to 34, wherein each of the plurality of microscope modules comprises an optical microscope configured to image tissue with a resolution of 100 µm, 10 µm, 1 µm or finer.

Clause 36. The microscope system according to any of clauses 1 to 35, wherein each of the plurality of microscope modules is configured to transmit a signal to the processor indicating that the module has completed imaging of a slide on the module and is ready for removal of the slide on the module and receiving another slide.

Clause 37. The microscope system according to any of clauses 1 to 36, wherein each of the plurality of microscope slides comprises a unique identifier and each of the plurality of microscope modules comprises a unique identifier and wherein the processor is configured with instructions to route a slide to a microscope module in response to the unique identifier of the slide and the unique identifier of a microscope module.

Clause 38. The microscope system according to any of clauses 1 to 37, wherein the plurality of microscope modules, the cassette and the slide loader comprise an alignment structure to align the plurality of microscope modules, the cassette and the slide loader in order to align a plurality of slide receiving locations of the plurality of modules and a plurality of slide receiving locations of the cassette with the slide loader in accordance with coordinate references of the slide loader.

Clause 39. The microscope system according to any of clauses 1 to 38, wherein the slide loader is configured to adjust loading the slide into the selected microscope module based on parameters of the selected microscope module.

Clause 40. The microscope system according to any of clauses 1 to 39, wherein the cassette comprises a plurality of receptacles to receive the plurality of microscope slides and wherein each of the plurality of receptacles corresponds to a location to receive and remove the slide and wherein the processor is configured with instructions to associate the location of said each of the plurality of receptacles with an identifier of a slide stored in said each of the plurality of receptacles in order to place the slide in the receptacle subsequent to imaging the slide with a module among the plurality of modules.

Clause 41. The microscope system according to any of clauses 1 to 40, wherein the cassette comprises a plurality of receptacles divided into groups based on priority or scan need.

Clause 42. The microscope system according to any of clauses 1 to 41, wherein each of the plurality of microscope modules is configured to image a slide placed thereon independently of other microscope modules of the plurality of microscope modules.

Clause 43. The microscope system according to any of clauses 1 to 42, wherein at least one of the plurality of microscope modules comprises an illumination array comprising a plurality of illumination sources configured to illuminate a sample on a slide under a plurality of illumination conditions at a plurality of times.

Clause 44. The microscope system according to any of clauses 1 to 43, wherein the plurality of illumination conditions includes at least one of different durations, different intensities, different positions, different illumination angles, different illumination patterns, or different wavelengths.

Clause 45. The microscope system according to any of clauses 1 to 44, wherein the processor is further configured with instructions to detect microscope modules microscope modules coupled to the processor to update an index of available microscope modules.

As used herein the term "multiple" encompasses a "plurality" and refers to two or more.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A microscope system comprising:
a plurality of microscope modules;
a cassette for holding a plurality of slides;
a slide loader configured to move the plurality of slides between the cassette and the plurality of microscope modules; and
a processor coupled to the slide loader, the processor configured with instructions which, when executed, cause the slide loader to:
move a slide into or from a selected microscope module among the plurality of microscope modules.

2. The microscope system of claim 1, wherein the processor is configured with instructions to:
select a slide among the plurality of slides for scanning;
retrieve the selected slide from the cassette;
select a microscope module of the plurality of microscope modules;
load the slide into the selected microscope module; and
after the microscope module scans the slide, retrieve the slide from microscope module.

3. The microscope system of claim 1, wherein the slide loader comprises a linkage coupled to the processor to move the plurality of slides to the plurality of modules in response to instructions from the processor, to retrieve the plurality of slides from the plurality of modules, and to place the plurality of slides on the slide loader in response to instructions from the processor.

4. The microscope system of claim 3, wherein the plurality of microscope modules comprises a plurality of locations to receive the plurality of microscope slides and wherein each of the plurality of locations corresponds to one of the plurality of microscope modules and comprises a location separate from other locations of the plurality of locations and wherein the linkage is configured to place one or more of the plurality of slides at said each of the plurality of locations in response to instructions from the processor.

5. The microscope system of claim 4, wherein the processor is configured with a plurality of coordinate references corresponding to the plurality of locations and wherein the processor is configured with instructions to place each of the plurality of slides at a location among the plurality of locations based on the plurality of coordinate references and an identifier of the slide.

6. The microscope system of claim 5, further comprising an end effector coupled to the linkage and the processor, the end effector configured to engage a slide among the plurality of slides, remove the slide from the cassette, disengage the slide at a location among the plurality of locations, engage the slide at the location among the plurality of locations, remove the slide from the location, and place the slide on the cassette.

7. The microscope system of claim 5, further comprising a plurality of end effectors each coupled to the linkage and the processor and configured to engage and disengage the slide.

8. The microscope system of claim 1, wherein:
the plurality of microscope modules comprises a first microscope module comprising a first class of microscope and a second microscope module comprising a second class of microscope,
the first class and second class are selected from the group consisting of a high definition microscope, a digital microscope, a computational microscope, a 3D microscope, a phase imaging microscope, a phase contrast microscope, a dark field microscope, a differential interference contrast microscope, a lightsheet microscope, a confocal microscope, a holographic microscope and a fluorescence-based microscope,
the processor is configured to select between the first class and the second class based on the slide, and
the instructions cause the slide loader to move the slide to the first microscope module or the second microscope module in response selecting between the first class and the second class.

9. The microscope system of claim 1, wherein the instructions further comprise instructions for:
detecting the slide;
identifying the slide;
retrieving information about the identified slide; and
selecting, based on the information, the slide.

10. The microscope system of claim 9, wherein detecting the slide comprises detecting the slide in at least one of the cassette, the slide loader, or one of the plurality of microscope modules.

11. The microscope system of claim 9, wherein identifying the slide comprises reading at least one of a unique identifier, a bar code, an optical character recognition code, optical character recognition, a radio-frequency identification (RFID) tag, a user input, or a preview image of the slide.

12. The microscope system of claim 9, wherein the information comprises a priority for the slide and selecting the slide comprises selecting the slide based on comparing the priority to priorities of other slides in the cassette.

13. The microscope system of claim 9, wherein the information comprises a user-defined selection and selecting the slide comprises selecting the slide based on the user-defined selection.

14. The microscope system of claim 9, wherein the information comprises an order in a queue of slides in the cassette and selecting the slide comprises selecting the slide based on the order.

15. The microscope system of claim 1, further comprising a sensor for detecting and identifying slides.

16. The microscope system of claim 15, wherein the sensor comprises at least one of a camera, a barcode reader, or a laser.

17. The microscope system of claim 15, wherein the sensor is located on at least one of the cassette, the slide loader, or one of the plurality of microscope modules.

18. The microscope system of claim 15, wherein the sensor is configured to capture a preview image of the slide.

19. The microscope system of claim 1, wherein the instructions comprise instructions for selecting the selected microscope module, comprising:
identifying each of the plurality of microscope modules;
determining a scan capability for each of the plurality of microscope modules;
determining a scan need for the slide; and
selecting the microscope module based on the scan capability of the selected microscope module satisfying the scan need of the slide.

20. The microscope system of claim 19, wherein identifying each of the plurality of microscope modules comprises determining coordinates for each of the plurality of microscope modules.

* * * * *